Dec. 5, 1939.  C. E. WYRICK  2,182,529

MECHANICAL MOTOR DRIVE

Original Filed Jan. 6, 1937   5 Sheets-Sheet 1

INVENTOR
CLAYTON E. WYRICK
BY
ATTORNEYS

Dec. 5, 1939.     C. E. WYRICK     2,182,529
MECHANICAL MOTOR DRIVE
Original Filed Jan. 6, 1937     5 Sheets-Sheet 2

INVENTOR
CLAYTON E. WYRICK
BY
ATTORNEYS

Dec. 5, 1939.    C. E. WYRICK    2,182,529
MECHANICAL MOTOR DRIVE
Original Filed Jan. 6, 1937    5 Sheets-Sheet 3
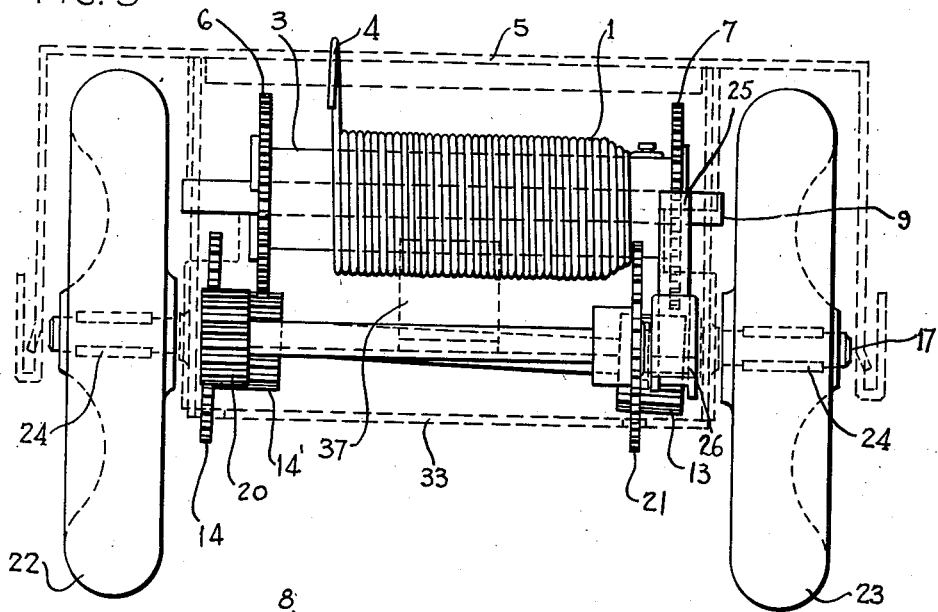
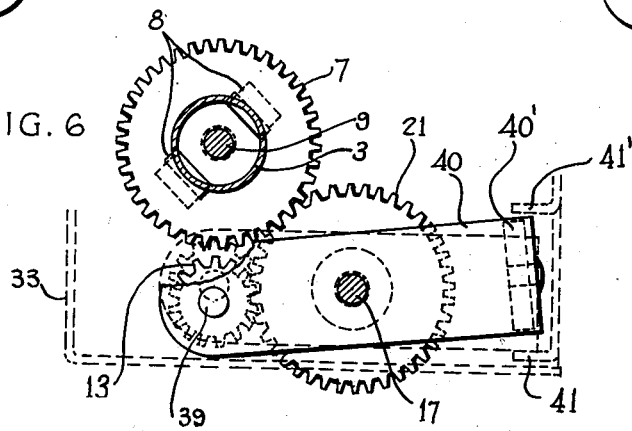
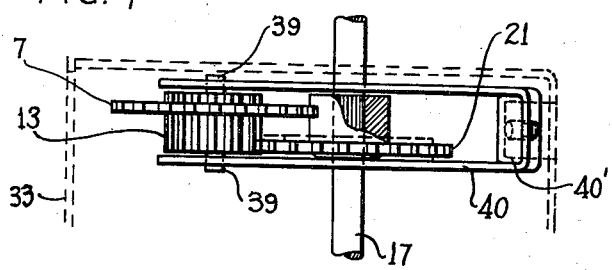
*INVENTOR*
CLAYTON E. WYRICK
BY
*ATTORNEYS*

Dec. 5, 1939.　　　　C. E. WYRICK　　　2,182,529
MECHANICAL MOTOR DRIVE
Original Filed Jan. 6, 1937　　5 Sheets-Sheet 4

INVENTOR
CLAYTON E. WYRICK
BY
ATTORNEYS

Dec. 5, 1939.         C. E. WYRICK         2,182,529
MECHANICAL MOTOR DRIVE
Original Filed Jan. 6, 1937    5 Sheets-Sheet 5
FIG. 13
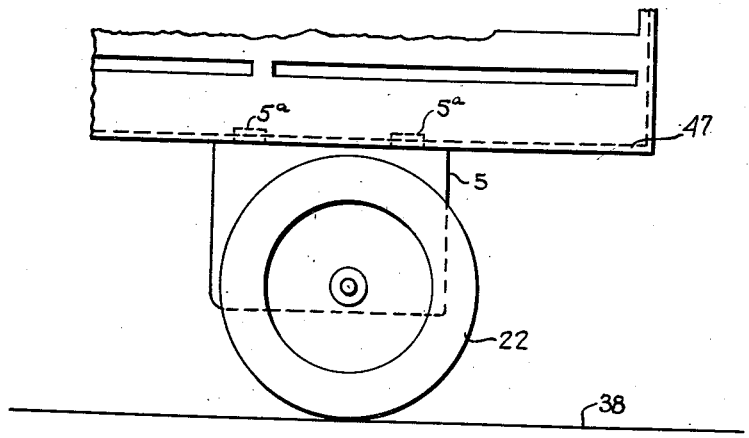
FIG. 14
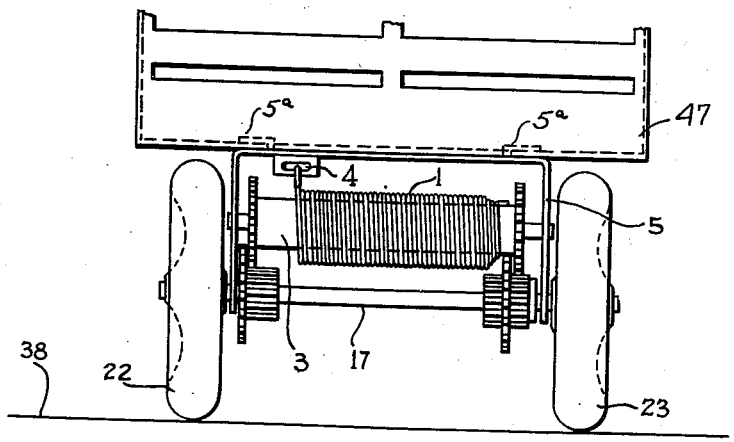
INVENTOR
CLAYTON E. WYRICK
BY
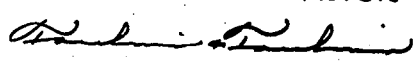
ATTORNEYS Patented Dec. 5, 1939

2,182,529

UNITED STATES PATENT OFFICE 2,182,529

MECHANICAL MOTOR DRIVE

Clayton E. Wyrick, Dayton, Ohio

Application January 6, 1937, Serial No. 119,313
Renewed May 3, 1939

19 Claims. (Cl. 185—39)

This invention relates to mechanical motor drive means and, in particular, to such means for use in motor driven toys such as automobiles, airplanes, trucks, tractors and the like.

It is an object of this invention to provide a motor which may be conveniently charged with power without the use of a key, a lever or other special winding accessory.

It is a further object of this invention to provide, for a vehicle, motor driven means wherein the power storage element may be charged by manually moving the vehicle to actuate a propelling element and wherein the stored power will be automatically diverted to drive the propelling element at the termination of the manual movement.

It is a further object of this invention to provide such a drive mechanism having a power storage element and a propelling element wherein manual actuation of the propelling element through one cycle will sufficiently charge the power element to enable the power storage element to drive the propelling element through a plurality of positively driven cycles.

It is a further object of this invention to provide, for a vehicle, motor means in which the power storage element may be rapidly charged with power to drive the vehicle forwardly by manually actuating or moving the vehicle in reverse direction.

It is a further object of this invention to provide such motor means wherein the transmission means, engaging the power storage and traction elements, are automatically disengaged at the termination of energy output from the power element to permit free coasting or rotation of the traction elements.

It is a further object of this invention to provide, in such a drive or motor mechanism, a power storage element, a propelling element, and transmission mechanism for engaging said elements, said transmission mechanisms being arranged to automatically engage and/or disengage in proper sequence in the power charging, power driving and coasting cycles in the operation of the device.

It is a further object of this invention to provide such motor means in which the operation of charging the power element may be accomplished efficiently and with natural human leverages.

It is a further object of this invention to provide such a motor or drive means in which the operation of charging the power element thereof may be accomplished through movement of the driven vehicle in reverse direction, winding the motor faster in the reverse direction than it unwinds when the vehicle is traveling in the forward direction.

It is a further object of this invention to provide such mechanism wherein the requirement, in winding, of extreme pressures or forces is totally obviated.

It is a further object of this invention to provide, in such means, extreme mechanical efficiency, low cost, strength and durability.

These and other objects and advantages will appear from the following description taken in connection with the drawings.

In the drawings:

Figure 5 is a rear elevation of the structure shown in Figures 1, 2, 3 and 4;

Figure 6 is a fragmentary view, in side elevation, illustrative of a modified form of the device;

Figure 7 is a top plan view of the structure shown in Figure 6;

Figure 13 is a side elevational view of the device of Figures 1 to 5 inclusive, as applied to a modified form of vehicle body and illustrative of the mode of attachment thereto; and Figure 14 is an end view in elevation of the structure shown in Figure 13, as seen from the right of Figure 13, looking toward the left.

Figure 1:
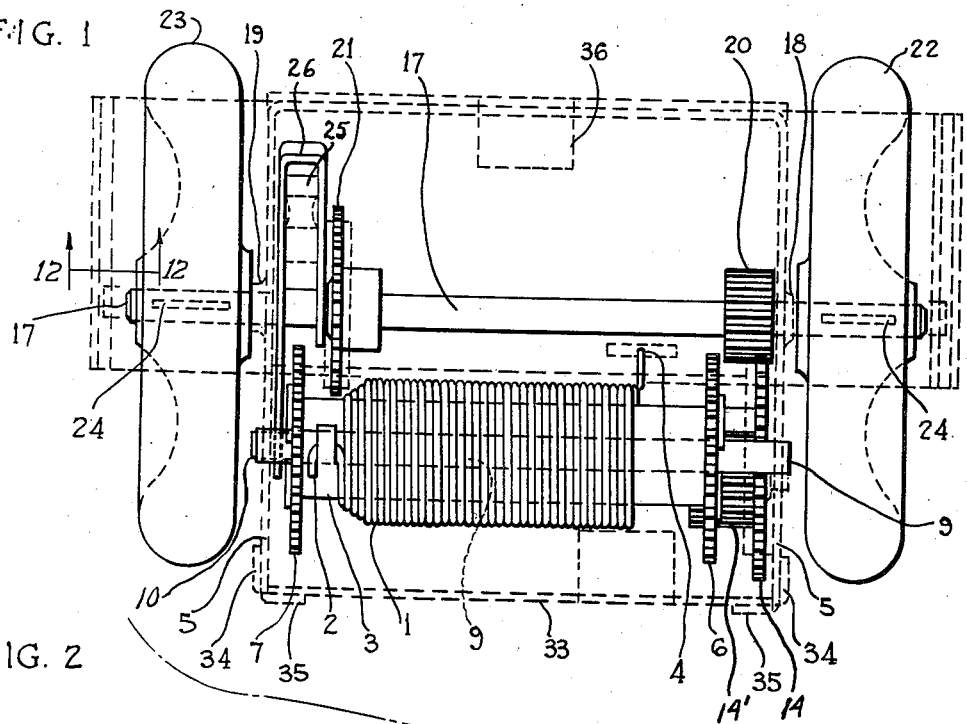
Figure 1 is a top plan view of the device with the supporting structure shown in dotted lines.

Referring to the drawings in detail, and with reference particularly to Figures 1 to 5 inclusive, the coil spring power element 1 is attached at 2 to the tubular core 3 and the opposite end thereof is attached at 4 to the supporting frame 5. The tubular core 3 is provided at one end with the gear 6 and at the other end with the gear 7 rigidly secured thereto by means of lugs 8. The tubular core 3 and gears 6 and 7 form an integral spring spool, which spool is rotatably supported in the frame 5 by the spool shaft 9.

Figure 2:
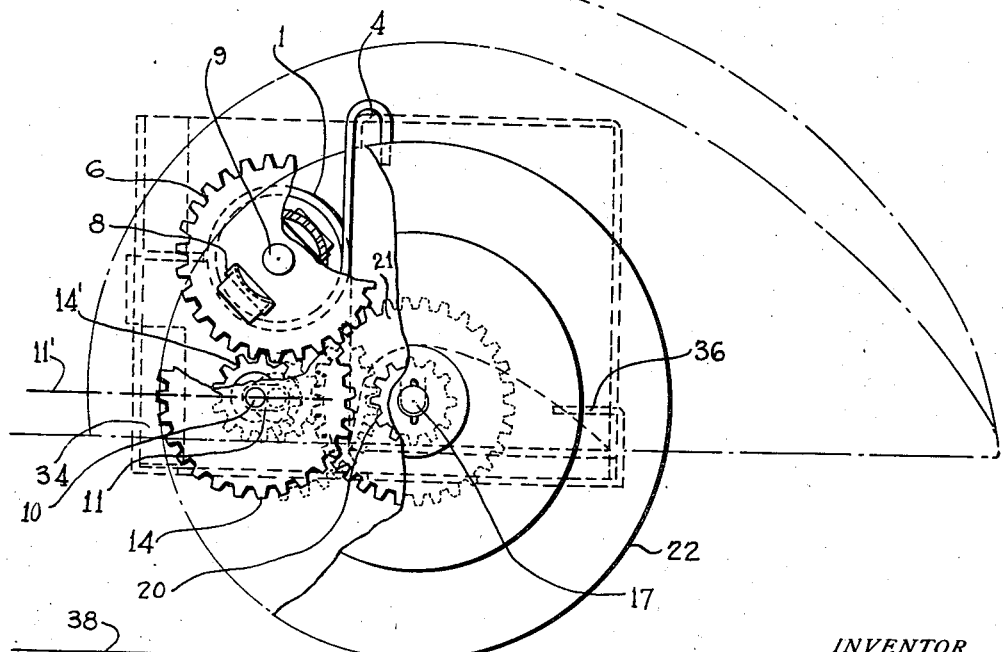
Figure 2 is a side elevation of the structure of Figure 1, as seen from the right of Figure 1, looking toward the left.
Figure 3:
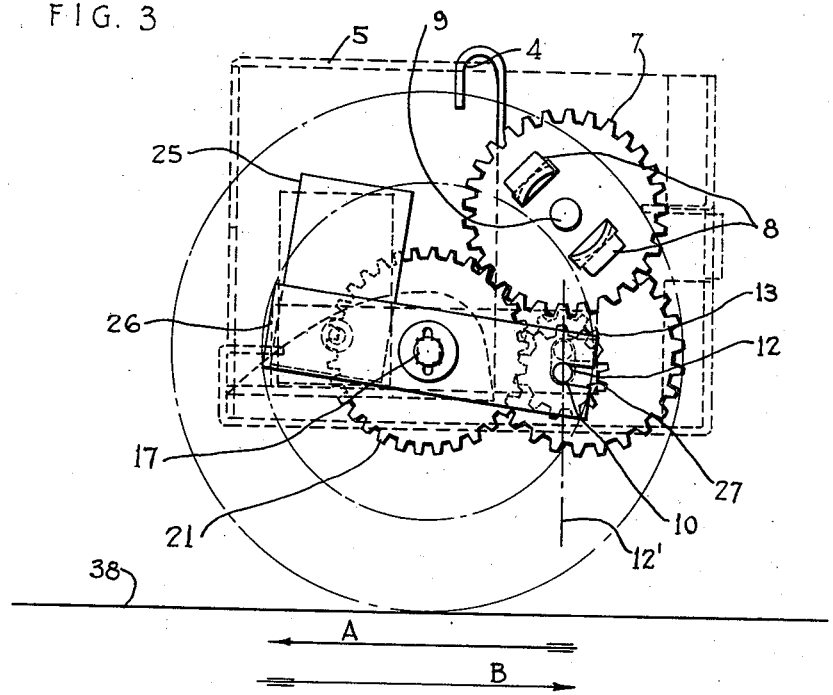
Figure 3 is a view similar to Figure 2, but showing the apparatus of Figure 1, as seen from the left, looking toward the right.
Figure 4:
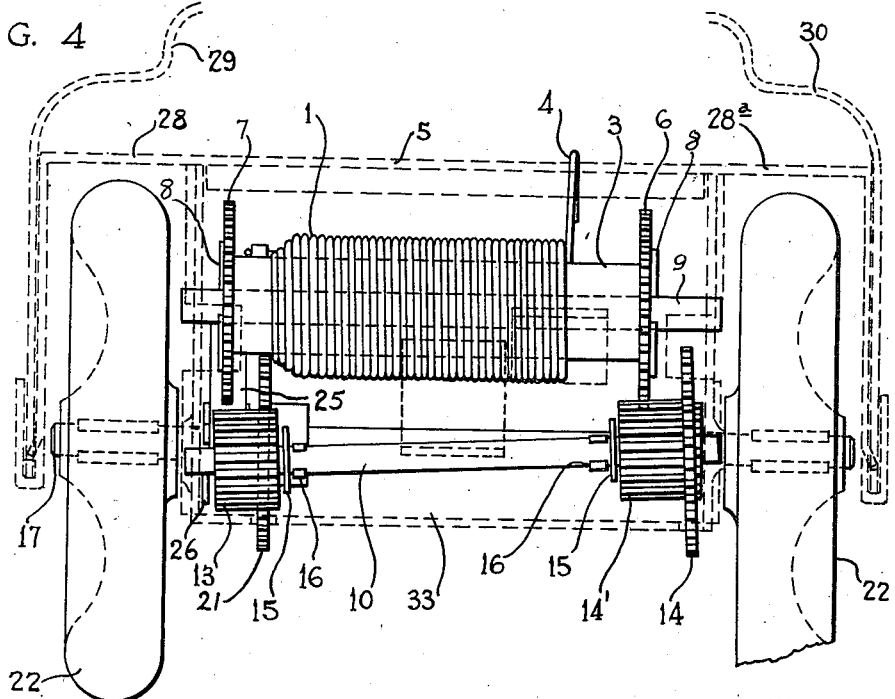
Figure 4 is a front elevation of the structure shown in Figures 1, 2 and 3.

An idler shaft 10 has one end thereof supported in the substantially horizontal slot 11 in the frame 5 (Figure 2) and the other end supported in the substantially vertical slot 12 at the opposite side of the frame 5 (Figure 3). The right end of the idler shaft 10, as seen in Figures 1, 2 and 4, is adapted for movement along the center line 11' (Figure 2). The opposite or left end of the idler shaft 10, as seen in Figures 1, 3 and 4, is adapted to move along the center line 12' (Figure 3). Rotatably mounted on the left end of the idler shaft 10, as seen in Figures 1 and 4, is an idler gear 13. Rotatably supported on the opposite or right end of the idler shaft 10, as seen in Figures 1 and 4, is the cluster gear 14, 14'. The idler gear 13 and the cluster gear 14, 14' are secured against excessive axial movement on the idler shaft 10 by means of washers 15 and upset portions 16 of the idler shaft 10.

An axle shaft 17 (Figures 1 and 4) is supported at the right end in the fixed bearing 18 and at the left end in the fixed bearing 19 of the frame 5. Rigidly secured to the right end of the axle shaft 17, by means of a press fit or other suitable means, is the pinion gear 20 which is adapted, under certain conditions, to engage the gear 14 of the cluster gear 14, 14'. At the other or opposite end of the axle shaft 17 is likewise rigidly secured a gear 21 having the hub thereof suitably rigidly attached to the axle shaft 17. A traction wheel 22 is rigidly secured by means of a press fit and upset portions 24 to the right end portion of the axle shaft 17. The traction wheel 23 is likewise secured by means of a press fit and the upset portions 24 to the left end portion of the axle shaft 17, as seen in Figure 1.

A balance weight member 25 (Figure 3) is rigidly secured in a shifting frame 26 which is pivotally supported on the axle shaft 17 and which terminates in a forward U-shaped portion 27 which engages the left end (Figures 1 and 4) of the idler shaft 10. The pivotal movement of the shifting frame 26 with respect to the axle shaft 17 is limited by the slot 18 (Figure 3).

Figure 12:
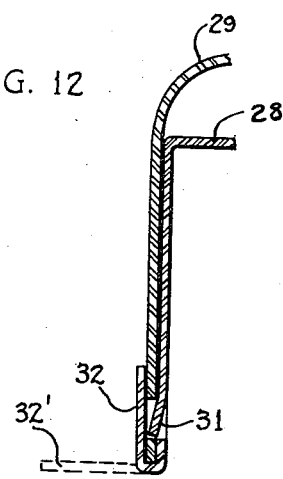
Figure 12 is a fragmentary view, in section, taken on the line 12—12 of Figure 1.

The frame 5 which is shown in dotted lines in order to avoid obscuring the operating parts of the device has two like extended portions 28 and 28a which are formed to engage the fenders 29 and 30 of the vehicle body which is also shown in dot and dash lines to prevent obscuring the operating parts of the device. As shown in Figure 12, a lug 31 is struck out from the extended portion 28 and is adapted to engage a properly located aperture in the fender 29 of the vehicle body. The guard portion 32 which extends downwardly of the extended portion 28 is bent from the position 32', shown in Figure 12, to the position 32, as therein shown, in order to securely lock the extended portion 28 to the fender 29 of the vehicle body. The extended portion 28a is secured to the fender 30 of the vehicle body in like manner. By this means, the frame 5 is rigidly secured to the vehicle body.

A cover or guard member 33 provided with flanges 34, 34 is attached to the frame 5 by bent lugs 35, 35 and also the lug 36 which is bent into an aperture 37 of the frame 5.

*Operation*

Referring to Figures 2 and 3, the line 38 designates a floor or other supporting surface engaged by the traction wheels 22 and 23. With the traction wheels 22 and 23 engaging the surface 38, the vehicle is moved in the direction of the arrow A to rotate the wheels clockwise, as seen in Figure 2. The power charging transmission assembly comprising idler gear 13, shifting frame 26, and balance wheel 28 (which is substantially in poise) is urged in counterclockwise direction, as seen in Figure 3, due to energy caused by constant mesh of gears 21 and 13 and counterclockwise rotation of gear 21, as seen in Figure 3. By the counterclockwise shifting of the shifting frame 26, the gear 13 is brought into mesh with the gear 7. Further movement of the vehicle in the direction of the arrow A will cause the core 3 to be rotated in counterclockwise direction, as seen in Figure 3, whereby to wind the spring 1.

During this time, the righthand end of the idler shaft 10, as seen in Figures 1 and 4, is in the forwardmost position of the slot 11, as shown in Figure 2, whereby to allow the gear 14 which is integrally secured to the gear 14' (which latter gear is in mesh with the gear 6) to rotate free of the pinion 20 on the axle shaft 17.

When the manual power action or winding terminates and the spring 1 is permitted to cause clockwise rotation of the gear 7, as seen in Figure 3, the gear 6, which is rigidly secured by means of the spool 3 to the gear 7, will rotate in the same direction, namely, clockwise as seen in Figure 3 and counterclockwise as seen in Figure 2. With reference particularly to Figure 2, it will be seen that counterclockwise rotation of the gear 6 is transmitted to the pinion 14' of the cluster gear 14, 14' and thence transmitted through the gear 14 of the cluster gear to the pinion gear 20 on the axle shaft 17. While this driving is occurring, the shifting frame 26 is urged into clockwise direction as seen in Figure 3, whereby the idler pinion 13 is free of the gear 7, as shown in Figure 4. Motion is thus transmitted from the gear 6 through the cluster gear 14', 14 to pinion 20 which is rigid with the axle shaft 17. At this time, the gear 21, which is also rigid with the axle shaft 17, will rotate in the same direction as the pinion 20 and will remain in mesh with the idler pinion 13. The idler pinion 13, as described above, rotates free of the gear 7 and in the opposite direction.

After the stored energy in the power element, or spring 1 is dissipated, the gear 6 and the gear 7 cease to rotate and the cluster gear 14, 14' being then urged in clockwise direction, as seen in Figure 2, due to the stationary disposition of the gear 6 which is in mesh with the portion 14' of the cluster gear, the cluster gear pivots about the teeth of the portion 14' thereof, which are engaged with the gear 6, and thus moves forwardly in the slot 11 or into the position shown in Figure 2, where the gear 14 is free of the pinion 20 on the axle shaft 17. The axle shaft 17 continues to rotate in counterclockwise direction, as seen in Figure 2, and the pinion 20 and gear 21 which are rigid therewith also rotate in counterclockwise direction. The pinion 20 being free of the gear 14 and the hub gear 21 being in mesh with the idler pinion 13, which is free of the gear 7 on the spool 3, the axle shaft 17 is thus permitted to rotate freely whereby the vehicle continues to coast after termination of or dissipation of the power in the spring 1.

Attention is particularly directed to the fact that, during the winding or power charging operation, the gear ratio between the axle shaft 17 and the gear 7 is lower than the ratio between the gear 6 and the pinion 20 during the drive operation. In other words, one rotation of the axle shaft 17, during winding, stores sufficient power in the spring 1 to cause a plurality of rotations of the axle shaft 17 during the power drive. The ratio of winding revolutions to power revolutions may, of course, be changed by varying the number of teeth in the respective gears and pinions of the power connection.

Due to the free rotation of the axle shaft 17, after the power in the spring 1 has been completely exhausted or dissipated, the vehicle will, under its own momentum and the rotary momentum of the safety rotating axle shaft 17, coast or roll for a substantial distance after the power drive has ceased.

*Modification of power charging transmission means*

Figure 8:
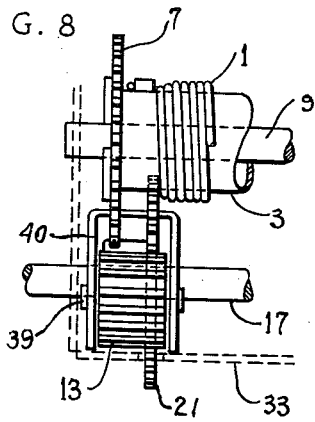
Figure 8 is an elevational view of the structure shown in Figure 6, as seen from the left of Figure 6, looking toward the right.

In Figures 6, 7 and 8, I have illustrated a modified form of power charging transmission means to be substituted for that described above.

In this construction, the idler shaft 10 is omitted and the idler pinion 13 is rotatably journaled at 39, 39 in a reconstructed U-shaped shifting frame 40 adapted to be substituted for the shifting frame 26 and pivotally mounted in like manner on the axle shaft 17. The shifting frame 40, in which the idler pinion 13 is mounted, is balanced by the balance weight 40' disposed at its rear end. Lugs 41 and 41' which are struck up from the supporting frame are provided for limiting the pivotal movement of the shifting frame 40 about the axle shaft 17 as a pivot.

As will be understood from Figures 6, 7 and 8, when winding, the axle shaft 17 and the gear 21 which is rigidly secured thereto rotate in clockwise direction, as shown in Figure 6. This causes the shifting frame 40 to be overbalanced in clockwise direction, whereby it moves downwardly into engagement with the lower lug 41. The idler pinion 13 is then engaged with the gear 7 to cause clockwise rotation of the spool 3, as seen in Figure 6. During the power operation, the rotation of the axle shaft 17 in counterclockwise direction, as seen in Figure 6, causes the shifting frame 40 to move upwardly into engagement with the lug 41', as seen in Figure 6, whereby to remove the idler pinion 13 from engagement with the gear 7. Therefore, as was the case in the structure illustrated in Figures 1 to 5 inclusive and described above, the idler pinion 13 meshes with the gear 7 during the winding, but is disengaged therefrom during the power operation in order to permit rotation of the axle shaft 17 and gear 21.

*Modification of power driving transmission means*

Figure 9:
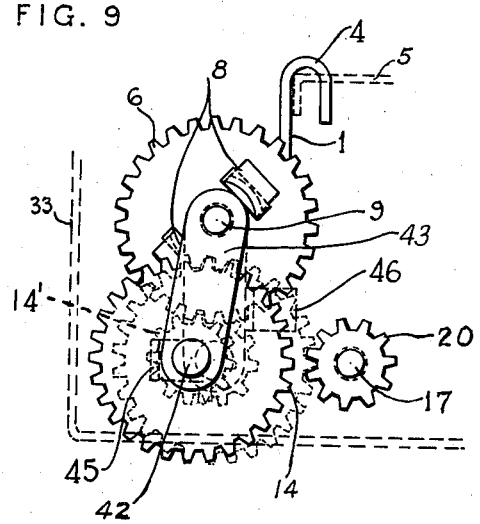
Figure 9 is a fragmentary elevational view similar to Figure 6, but illustrative of a second modified form of transmission means.
Figure 10:
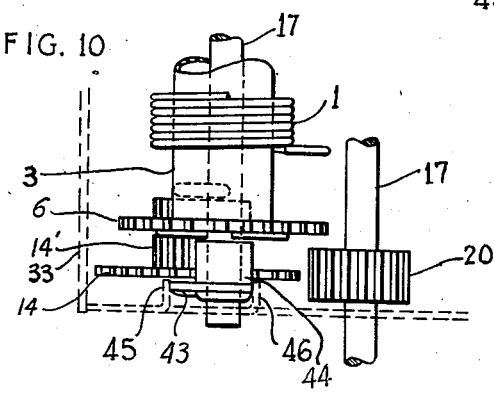
Figure 10 is a top plan view of the structure illustrated in Figure 9.
Figure 11:
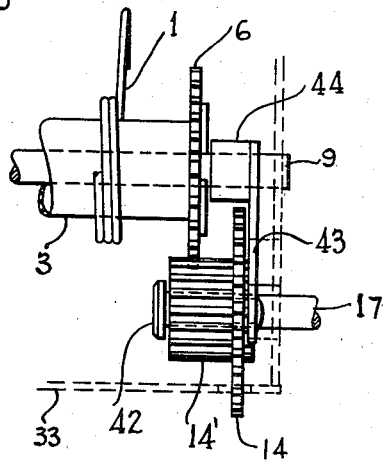
Figure 11 is a view, in elevation, of the structure shown in Figure 9, as seen from the left of Figure 9, looking toward the right.

In the modified construction of the power driving transmission means illustrated in Figures 9, 10 and 11, the idler shaft 10 and slot 11 are omitted and the cluster gear 14, 14' is rotatably supported on the stud 42 which is riveted to a pendant 43. The pendant 43 is securely fixed to a hub 44, which hub is swingably mounted on the spool shaft 9. The swinging movement of the assembly is limited by the lugs 45 and 46 (Figure 10).

During winding, clockwise rotation of gear 6 (Figure 9), which meshes with pinion 14' of the cluster gear, urges the pendant 43 also in clockwise direction, whereby to separate gear 14 of the cluster gear from the pinion 20 on the axle shaft 17.

When power charging is completed and the gear 6 is rotated by power in counterclockwise direction (Figure 9), the gear 14 of the cluster gear 14, 14' is brought into mesh with the pinion 20 on the axle shaft 17. The axle shaft 17 is then driven in counterclockwise direction, as seen in Figure 9.

When the power drive is completed and the energy dissipated, the gear 6 becomes stationary, thus locking its meshing pinion 14' and its integral gear 14 in substantially stationary position. Continued rotation of the pinion 20 of the axle shaft 17 in counterclockwise direction will cause the pinion 14' of the cluster gear to pivot about its teeth which are in mesh with the gear 6 which causes the pendant 43 to pivot in clockwise direction about the shaft 9, whereby the gear 14 is removed from mesh with the pinion 20, the parts taking the position shown in full lines in Figure 9. Removal of the gear 14 from mesh with the pinion 20 disconnects the axle shaft 17 from the power mechanism, whereby the axle shaft 17 may rotate free of the power mechanism and the vehicle may coast after the power drive is completed.

In Figures 13 and 14, the mechanism is illustrated as applied to the body 47 of a toy truck or other suitable toy vehicle. As shown in these figures, a pair of lugs 5a is struck up from the horizontal portion of the frame 5, which lugs are inserted through suitable apertures in the floor of the body 47 and so bent over as to rigidly secure the horizontal portion of the frame 5 to the horizontal bottom surface of the body 47. If desired, suitable housing means may be provided for the frame 5.

It will be understood that the above described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. In a power drive mechanism, a power storage member, a driven member, and connecting means adapted upon movement of said driven member in one direction automatically to connect said power storage member to said driven member for storage of energy therein, adapted, upon completion of storage of energy, drivingly to connect said driven member to said power storage member, and adapted, upon dissipation of the energy in said power storage member, automatically to disconnect said driven member from said power storage member for free movement.

2. In a power drive mechanism, a rotary power storage member, a rotary driven member, and connecting means adapted automatically upon rotation of said driven member in one direction to connect said power storage member to said driven member for storage of energy therein at a predetermined relative rate, and adapted, upon completion of storage of energy, to thereafter drivingly connect said driven member to said power storage member for impelling rotation in the opposite direction at a lesser relative rate.

3. In a power drive mechanism, a rotary power storage member, a rotary driven member, and connecting means adapted automatically upon rotation of said driven member in one direction to connect said power storage member to said driven member for storage of energy therein, adapted, upon completion of storage of energy, drivingly to connect said driven member to said power storage member for rotation in the opposite direction, and adapted, upon dissipation of the energy in said power storage member, automatically to disconnect said driven member from said power storage member for free rotation in said last-named direction.

4. In a power drive mechanism for a toy, a power storage element, a driven shaft having wheels thereon, and means of connection between said power storage element and said driven shaft, said last-named means being adapted automatically to connect said element and said driven shaft for winding said power storage element when the wheels are rotated in reverse direction by rearward movement of said toy, said rotary power storage member being adapted to be freed from engagement with the driven member at intervals.

5. In a power drive mechanism for a toy, a power storage element, a driven shaft having traction wheels thereon, and means of connection between said power storage element and said driven shaft, said last-named means being adapted, when the wheels on said driven shaft are reversely rotated by rearward movement of said toy, automatically to connect said power storage element with said driven shaft for winding, and adapted, immediately upon cessation of the rearward movement of said toy, automatically to drivingly connect said driven shaft to said power storage element for drive thereby, said driven shaft being arranged to store power at a higher rate when rotated in one direction than the rate of delivery of said power to said shaft for impelling rotation in the opposite direction.

6. In a power drive mechanism for a toy, a power storage element, a driven shaft having traction wheels thereon, and means of connection between said power storage element and said driven shaft, said last-named means being adapted, when the wheels on said driven shaft are reversely rotated by the rearward movement of said toy, automatically to connect said power storage element with said driven shaft for winding thereby, adapted, immediately upon cessation of the rearward movement of said toy automatically to drivingly connect said driven shaft to said power storage element for drive thereby, and automatically operable, upon exhaustion of the energy in said power storage element, to disconnect said driven shaft from said power storage element for free rotation of said driven shaft and coasting of said toy.

7. In a power drive mechanism for a toy, a driven shaft, a power element, and transmission means adapted, upon rotation of said driven shaft in one direction, automatically to connect said power element with said driven shaft for rotation thereby at a higher angular speed, and adapted, upon termination of the rotation of said driven shaft, to positively connect said driven shaft with said power storage element for impelling rotation thereby at a lower angular speed.

8. In a power mechanism for a toy, a driven shaft, a power element, and transmission means adapted, upon rotation of said driven shaft in one direction, automatically to connect said power element with said driven shaft for rotation thereby at a higher angular speed, adapted, upon termination of the rotation of said driven shaft, automatically to connect said driven shaft with said power storage element for rotation thereby at a lower angular speed and adapted, upon cessation of rotation of said power element, to automatically disengage said driven shaft from said power element to permit coasting thereof.

9. In a power drive mechanism, a spring spool having a gear at one end, a driven shaft having a gear at each end and means operable automatically upon rotation of said driven shaft in one direction to connect one of said last-named gears with the gear on said spring spool for winding said spring spool from said driven shaft at a higher angular rate, said connecting means comprising an idler shaft having one end mounted for movement in a vertical slot and an idler pinion rotatably mounted thereon and adapted to mesh with a gear on said driven shaft and the gear on said spring spool, and means for controlling the meshing of said idler pinion with said gear on said spring spool comprising a poised shifting frame pivoted about said driven shaft and having one end in engagement with said idler shaft and having the opposite end thereof provided with a counterweight.

10. In a power drive mechanism, a spring spool having a gear at each end, a driven shaft having a gear at each end, and an idler shaft having one end mounted for vertical movement, an idler pinion rotatably mounted on the vertically movable end of said idler shaft and adapted to engage with one of said gears on said driven shaft and one of said gears on said spring spool to provide for winding of said spring spool from said driven shaft at an increased angular speed, and means for controlling the meshing of said idler pinion with the gear on said spring spool comprising a shifting frame having at one end a notch engaging the vertically movable end of said idler shaft, said shifting frame being pivotally mounted on said driven shaft and having a weight at the end thereof opposite said notch, said shifting frame being responsive to the rotation of said driven shaft in one direction to withdraw said idler pinion from engagement with the gear on said spring spool and being responsive to rotation of said driven shaft in the opposite direction to engage said idler pinion with said gear during winding.

11. In a power drive mechanism, a spring spool having a gear at each end, a driven shaft having a gear at each end, and an idler shaft having one end mounted for vertical movement and the other end mounted for horizontal movement, an idler pinion rotatably mounted on the vertically movable end of said idler shaft and adapted to engage with one of said gears on said driven shaft and one of said gears on said spring spool to provide for winding of said spring spool from said driven shaft at an increased angular speed, and means for controlling the meshing of said idler pinion with the gear on said spring spool comprising a shifting frame having at one end a notch engaging the vertically movable end of said idler shaft, said shifting frame being pivotally mounted on said driven shaft and having a weight at the end thereof opposite said notch, said idler shaft being provided at its horizontally movable end with a freely rotatable gear adapted to provide driving connection between said second gear on said spring spool and the second gear on said driven shaft when said idler pinion is disengaged from said first-named gear on said spring spool, in order to provide for drive of said driven shaft from said spring spool at reduced rate.

12. In a power drive mechanism, a spring spool having a gear at each end, a driven shaft having a gear at each end, and an idler shaft having one end mounted for vertical movement and the other end mounted for horizontal movement, an idler pinion rotatably mounted on the vertically movable end of said idler shaft and adapted to engage with one of said gears on said driven shaft and one of said gears on said spring spool to provide for winding of said spring spool from said driven shaft at an increased angular speed, and means for controlling the meshing of said idler pinion with the gear on said spring spool comprising a shifting frame having at one end a notch engaging the vertically movable end of said idler shaft, said shifting frame being pivotally mounted on said driven shaft and having a weight at the end thereof opposite said notch, said idler shaft being provided at its horizontally movable end with a freely rotatable gear adapted to provide driving connection between said second gear on said spring spool and the second gear on said driven shaft when said idler pinion is disengaged from said first-named gear on said spring spool, in order to provide for drive of said driven shaft from said spring spool at reduced rate, said last-named gear on said idler shaft being adapted to be automatically disengaged from driving connection with the gear on said driven shaft upon cessation of rotation of said spring spool in order to permit free rotation of said driven shaft.

13. In a power drive mechanism, a spring biased power storage element having a gear rigid therewith, a driven shaft having a pinion rigid therewith and in substantial alignment with the gear on said power storage element, and means for automatically connecting said pinion with said gear for rotation thereby at reduced speed and for automatically disconnecting said gear and pinion upon cessation of movement of said gear comprising an idler shaft having the end thereof adjacent said gear and pinion mounted for horizontal movement, and a freely rotatable cluster gear mounted on said idler shaft adjacent said horizontally movable end, said cluster gear having constant mesh with said gear on said power storage element and engaging the pinion on said driven shaft during the drive of said driven shaft from said power storage element.

14. In a power drive mechanism, a power storage element, a driven shaft having traction wheels, and transmission means adapted during reverse rotation of said driven shaft through said wheels automatically to connect said power storage element to said driven shaft for high speed winding thereof, and operable automatically, upon completion of winding of said power storage element, to drivingly connect said driven shaft to said power storage element for operation thereby in a direction opposite to the direction of winding at a speed reduced from the speed of said power storage element, said transmission means being adapted to alternately connect and disconnect the driving means with said driven shaft.

15. In a power drive mechanism, a power storage element, a driven shaft having traction wheels, and transmission means adapted during reverse rotation of said driven shaft through said wheels automatically to connect said power storage element to said driven shaft for high speed winding thereof, and operable automatically, upon completion of winding of said power storage element, to drivingly connect said driven shaft to said power storage element for operation thereby in a direction opposite to the direction of winding at a speed reduced from the speed of said power storage element, said transmission means being adapted, upon completion of the driving operation of said power storage means, automatically to disconnect said driven shaft from said power storage means for free rotation of said driven shaft.

16. In a toy vehicle, a vehicle body, a spring motor, a running gear adapted to be driven thereby and to drive said motor, and means for automatically connecting the running gear to wind the motor when the vehicle is traveling in the reverse direction and to disconnect the same and connect the motor for driving the vehicle when it is released to move forwardly.

17. In a toy, a vehicle body having a running gear, a spring motor gearing automatically connecting said spring motor and running gear when the toy is moved backwardly manually; and other gearing adapted when the toy is released to interconnect said spring motor with the running gear to drive the toy forwardly at which time the first-mentioned interconnecting gearing for the winding operation is moved out of engagement.

18. In a toy, a vehicle body having a running gear, a spring motor gearing automatically connecting said spring motor and running gear when the toy is moved backwardly manually; and other gearing adapted when the toy is released to interconnect said spring motor with the running gear to drive the toy forwardly at which time the first-mentioned interconnecting gearing for the winding operation is shifted out of engagement, said gearing being so proportioned that the spring motor is wound more rapidly than it unwinds.

19. In a toy, a vehicle body having a running gear, a spring motor gearing automatically connecting said spring motor and running gear when the toy is moved backwardly manually; and other gearing adapted when the toy is released to interconnect said spring motor with the running gear to drive the toy forwardly at which time the first-mentioned interconnecting gearing for the winding operation is disconnected, said gearing being so proportioned that the spring motor is wound more rapidly than it unwinds, and means associated with said gearing for effecting said connection and disconnection depending upon the pressure applied to said toy vehicle during the course of its movement in at least one direction.

CLAYTON E. WYRICK.